Jan. 11, 1927. 1,613,680
E. TIMBS
DRAW WORKS WITH COOLING APPARATUS
Filed May 26, 1925  2 Sheets-Sheet 1

Inventor
Edward Timbs.
By Lyon+Lyon
Attorneys.

Jan. 11, 1927. 1,613,680
E. TIMBS
DRAW WORKS WITH COOLING APPARATUS
Filed May 26, 1925   2 Sheets-Sheet 2
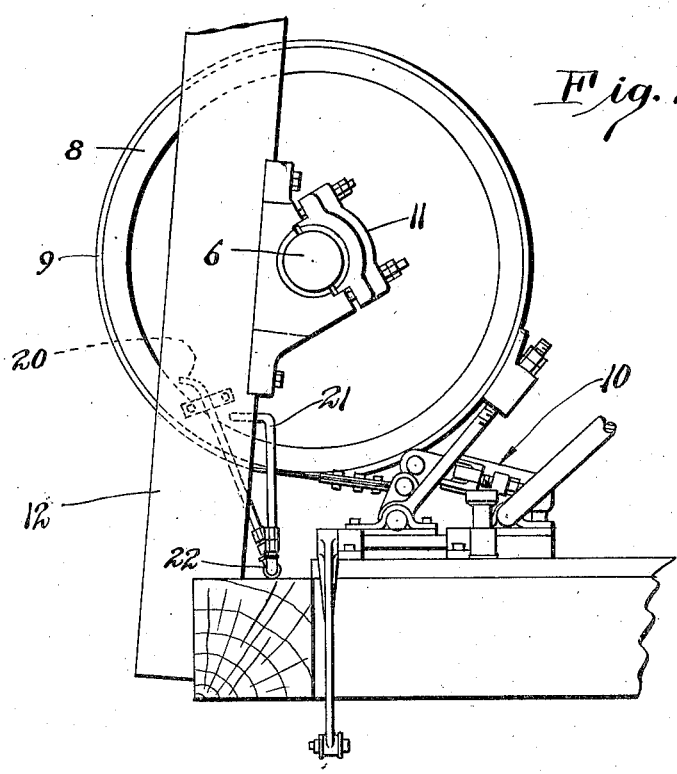
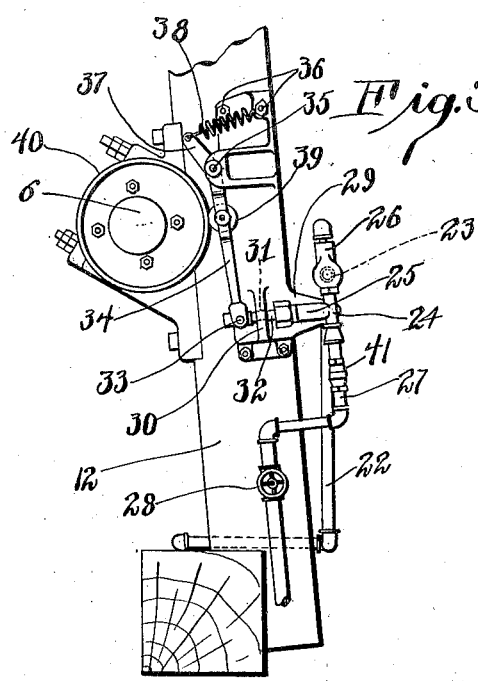
Inventor
Edward Timbs.
By Lyon & Lyon
Attorneys.

Patented Jan. 11, 1927.

1,613,680

UNITED STATES PATENT OFFICE.

EDWARD TIMBS, OF LOS ANGELES, CALIFORNIA, ASSIGNOR TO UNION TOOL COMPANY, OF TORRANCE, CALIFORNIA, A CORPORATION OF CALIFORNIA.

DRAW WORKS WITH COOLING APPARATUS.

Application filed May 26, 1925. Serial No. 33,037.

This invention relates to the cooling of the rims of brake drums of draw works and an object of the invention is to efficiently effect the cooling.

Another object is to provide a construction for this purpose in which the flow of water will automatically stop when the draw works drum is not rotating.

Other objects and advantages will appear in the subjoined detailed description.

The accompanying drawings illustrate the invention:

Fig. 2 is an end view of Fig. 1 from the left thereof, the brake band operating mechanism, omitted from Fig. 1, being shown.

Fig. 3 is a fragmental end elevation from the right of Fig. 1 showing the operating connections between the pump and the drum shaft.

Figure 1:
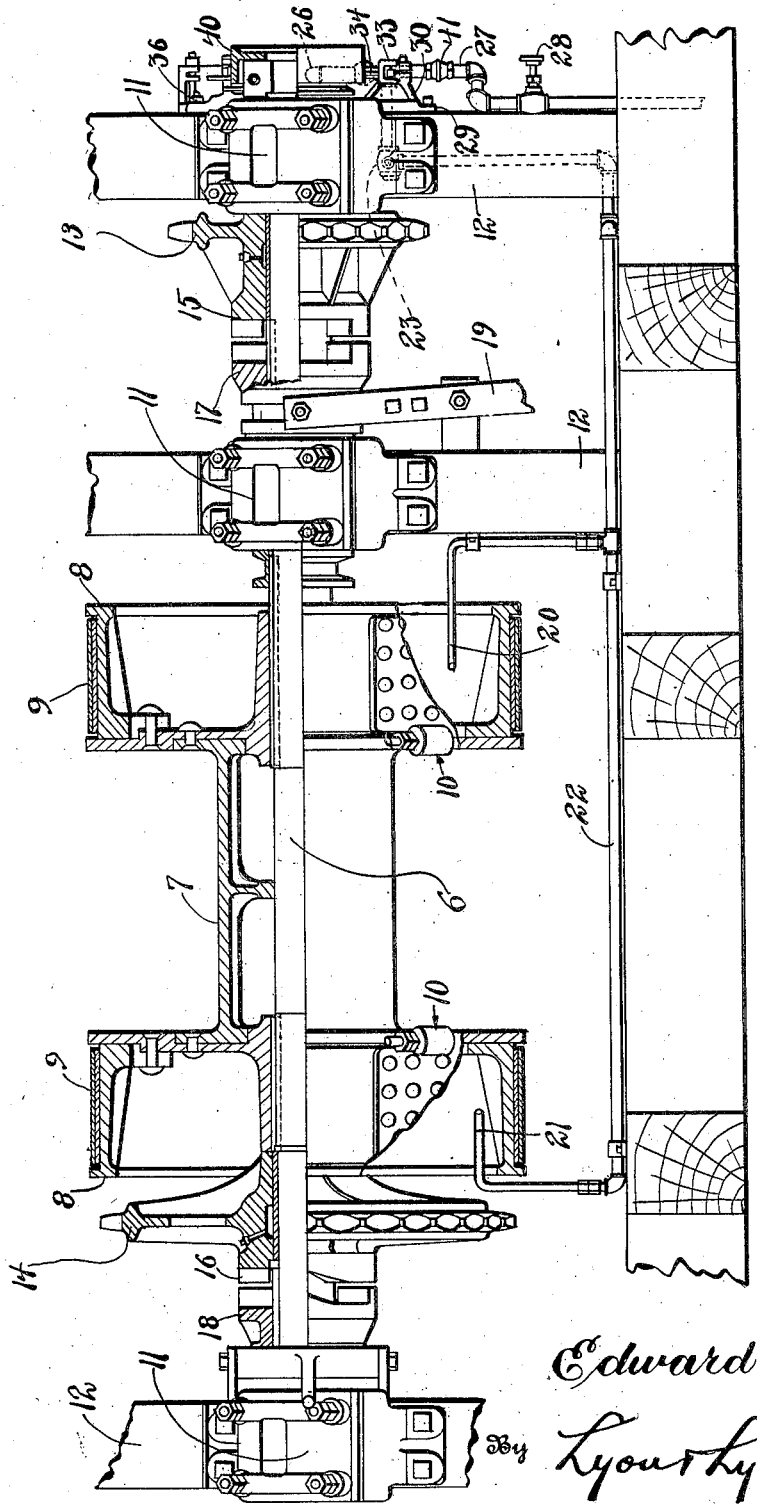
Fig. 1 is a side elevation, the upper half in midsection, of a draw works with cooling apparatus constructed in accordance with the provisions of this invention. The brakeband operating mechanism is omitted.

The shaft of the draw works is indicated at 6 and mounted thereon is a hoisting drum 7 provided at opposite ends with brake drums 8. Surrounding the brake drums 8 are brake bands 9 which are contracted on the drums by suitable band-operating mechanism indicated in general by the character 10. Such mechanism is well understood in this art and, accordingly, need not be described in detail herein as the invention only includes the band-operating mechanism broadly in combination with other features.

The shaft 6 is supported in suitable bearings 11 supported on upright frame members 12. Loose on the shaft 6 is a driving means in the form of sprockets 13, 14. The sprockets are connected at will to the shaft, to drive the same at different speeds, by clutch members 15, 16 or the sprockets 13, 14, respectively, which cooperate with clutch members 17, 18 splined to the shaft. The clutch may be operated by any suitable mechanism, a portion of which is indicated at 19.

The foregoing is a description of a typical draw works and, as is well known, the brake drums of such a draw works tend to become highly heated at times by the friction of the brake bands thereon. The high temperatures are detrimental to the brake band linings and, accordingly, I have devised means operatably connected with the shaft 6 to cool the brake drums. The cooling is effected by a cooling medium directed onto the inner faces of the drums by nozzles 20, 21. The nozzles extend horizontally into the open ends of the drums and are supplied with the cooling medium through a pipe line 22. The pipe line 22 has in it a three-way valve 23 and connects through a T 24 with one end of a plunger pump cylinder 25. Between the T 24 and the three-way valve 23 is a relief valve 26. Connected with the T 24 is a supply pipe line 27 which is provided with a globe valve 28. The pipe line 27 may receive its supply of cooling medium from any suitable source, water generally being employed.

The pump cylinder 25 is bolted to a bracket 29 which is provided with a boss 30 having a hole 31 in line with the pump cylinder, and the plunger 32 of the pump passes through the hole 31 and is guided thereby. The plunger 32 is pivoted at 33 to an operating member which, in this instance, is a lever 34 fulcrumed at 35 on the upper part of the bracket 29. The bracket 29 is secured by bolts 36 to one of the upright frame members 12. The lever 34 is provided with an arm 37 to which is attached one end of a coil spring 38, the other end of said spring being anchored to one of the bolts 36. On the lever 34 is a follower 39 which is in the form of a roller that engages the periphery of a cam 40 mounted on and operated by the shaft 6 of the draw works. When the shaft 6 operates, it causes the cam 40 to actuate the pump plunger on its in or discharge stroke and the spring 38 operates the lever 34 to move the plunger on its out or suction stroke.

In practice, assuming that the draw works is not operating and that, consequently, the pump is idle, if the valve 28 is open, the cooling medium will pass through the check valve 41 to the pump and is stopped by the relief valve 26 which is adjusted to just overcome the pressure in the water supply line, thus automatically shutting off the supply of cooling medium from the nozzles when the pump is inactive. When the draw works operates it causes operation of the pump and the check valve 41 then admits water to the pump on the out stroke of the plunger and prevents a return of the cooling medium on the instroke of the plunger so that the pump will force the water through the relief valve 26 and three-way valve 23.

The quantity of cooling medium supplied to the drum will be regulated through proper adjustment of the three-way valve which may also be operated to test the relief valve.

From the foregoing, it will be clear that water flows to the brake drums to effect cooling thereof only when the draw works is in operation, even though the water supply line valve 28 be open while the draw works is not operating.

I claim:

1. A draw works with cooling apparatus comprising a hoisting drum, means to operate said drum, a brake drum connected with the hoisting drum, a brake band for the brake drum, means to operate the brake band, a pump operatably connected with the brake drum, a pipe for supplying a cooling medium to the pump, a nozzle connected with the pipe and projecting into the brake drum, and means to prevent flow of the cooling medium from the supply pipe to the nozzle when the pump is idle.

2. A draw works with cooling apparatus comprising a hoisting drum, means to operate said drum, a brake drum connected with the hoisting drum, a brake band for the brake drum, means to operate the brake band, a nozzle projecting into the brake drum, a pipe connected with the nozzle for supplying a cooling medium thereto, means operatably connected with the brake drum to force the cooling medium to the nozzle, and means automatically shutting off the supply of cooling medium from the nozzle when the first named means is inactive.

3. A draw works with cooling apparatus comprising a hoisting drum, means to operate said drum, a brake drum connected with the hoisting drum, a brake band for the brake drum, means to operate the brake band, a pump cylinder, a plunger for the cylinder, means operatably connected with the brake drum to operate the plunger, a T on one end of the cylinder, a supply pipe connected with said T, a pipe line leading from the T, a nozzle connected with the pipe line and projecting into the brake drum, a check valve in the supply pipe, and a relief valve in the pipe line.

Signed at Torrance, Calif., this 18th day of May 1925.

EDWARD TIMBS.